Oct. 30, 1951  L. J. HAWORTH  2,573,017
CATHODE-RAY TUBE APPARATUS FOR PRODUCING SECTOR SCAN
Filed Nov. 6, 1945  2 SHEETS—SHEET 1
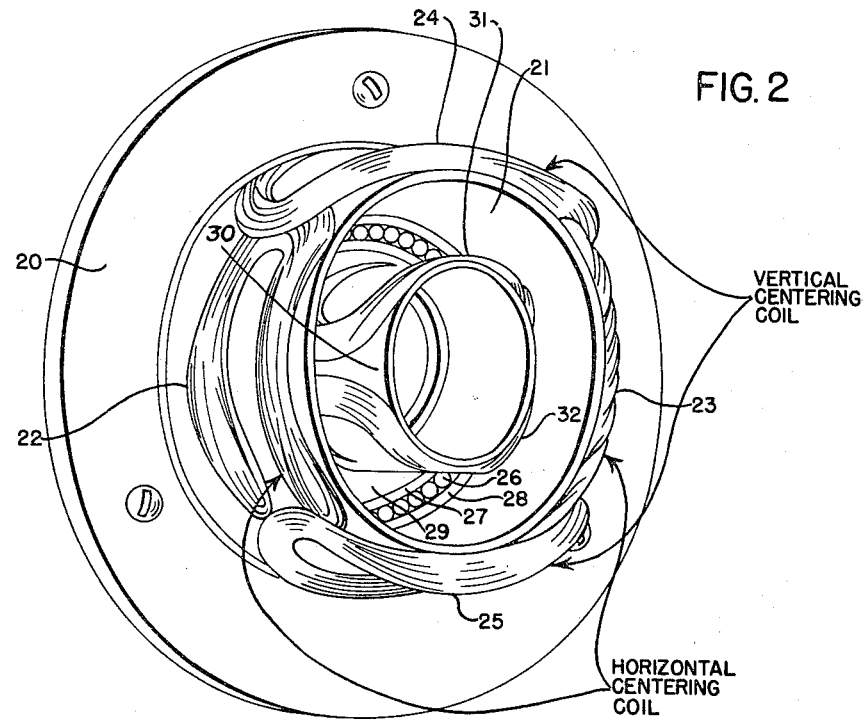
FIG. 2
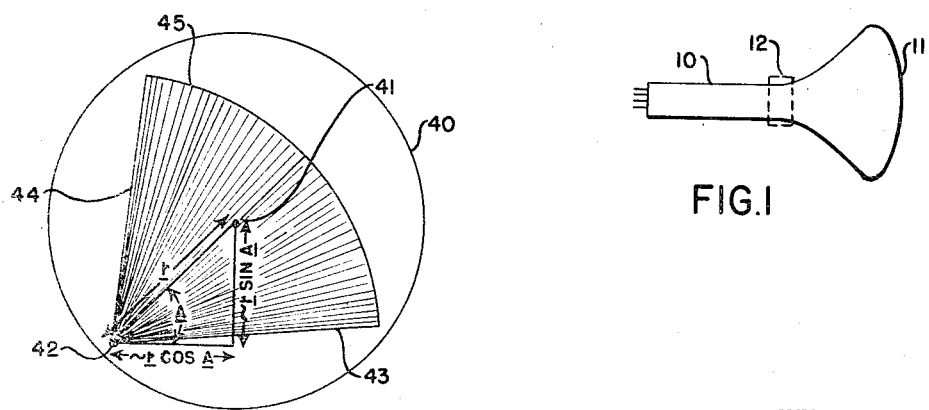
FIG. 3
FIG. 1
INVENTOR.
LELAND J. HAWORTH
BY
William D. Hall
ATTORNEY Oct. 30, 1951  L. J. HAWORTH  2,573,017
CATHODE-RAY TUBE APPARATUS FOR PRODUCING SECTOR SCAN
Filed Nov. 6, 1945  2 SHEETS—SHEET 2

INVENTOR.
LELAND J. HAWORTH
BY Harry M. Saragovitz
Attorney

Patented Oct. 30, 1951

2,573,017

UNITED STATES PATENT OFFICE 2,573,017

CATHODE-RAY TUBE APPARATUS FOR PRODUCING SECTOR SCAN

Leland J. Haworth, Belmont, Mass., assignor, by mesne assignments, to the United States of America as represented by the Secretary of War Application November 6, 1945, Serial No. 627,043

4 Claims. (Cl. 315—24)

This invention relates in general to means for providing a linearly increasing deflection of a spot on the face of a cathode ray tube, and more particularly to means whereby this deflection is brought about by the use of a varying magnetic field applied to the beam of electrons within the tube.

Most types of radio object-locating systems are units which transmit a steady stream of periodic pulses of electromagnetic energy into space. When these pulses impinge upon an object having a dielectric constant differing from that of the atmosphere through which the pulses are traveling, a portion of this electromagnetic energy is reflected from this object. Of this reflected portion, a small percentage finds its way back to the receiving antenna of the object-locating system.

In general, systems of this type employ a cathode ray tube, with associated deflecting circuits, in which the scanning of the face of the cathode ray tube is synchronized by the transmitted pulse. One desirable arrangement is one in which the spot on the face of the tube starts its sweep motion at the same time the pulse is sent out from the transmitter. The energy of the pulse that is reflected from the aforementioned object is applied to the cathode ray tube in such a manner that it shows up on the face thereof and the distance on the face of the tube between the spot representing the transmitted pulse and that representing the received pulse may easily be measured.

In one type of indication used with radio object-locating systems, the grid-cathode voltage of the tube is quiescently kept below the cutoff value of potential, so that normally no electrons cause the screen to fluoresce. When the amount of electromagnetic energy reflected from an object is picked up, however, it is applied to one of these electrodes in such a manner that electrons are allowed to cause the screen to fluoresce and so to show up this spot on the face of the tube.

In some types of radio object-locating systems, it is desirable to determine quite accurately the azimuth direction of the object being detected. This may be done by using a directional antenna and rotating this antenna in the azimuth plane so that a 360° section of space may be searched. In order that some indication of the azimuth position of an electromagnetic echo be had, a type of cathode ray tube sweep referred to as Plan Position Indication, or PPI, may be used. In one form of this type of indication, the sweep voltage starts from the center of the face of the cathode ray tube and sweeps outwardly. The deflection means are then so arranged, either mechanically or electrically, so that the direction of sweep at any instant will represent the direction the antenna is pointing at that instant. One disadvantage of some forms of a PPI type of scan is that only about one-half of the width of the face of the cathode ray tube is utilized for any one sweep cycle.

It is often desirable to search only a small angle of the possible 360° field of space. This may be called a sector type of scan. It may be desired to present only this angle of search on the screen, and to blank out the rest of the 360°. One manner in which this may be accomplished is to provide a continuously rotating antenna equipped with two micro switches. One of these switches will turn off the sweep circuit, or blank out the cathode ray tube, at one extremity of the desired sector, while the other switch will turn on the sweep again, or unblank the tube, at the other extremity. Another method of providing a sector scan is to use an antenna which has a reciprocal rotating motion. This antenna will scan back and forth over the desired angle of search.

Among the objects of the present invention, therefore, are:

1. To provide a sweep means for a cathode ray tube used in conjunction with certain types of radio object-locating systems;

2. To provide such a sweep means employing a sector type of scan; and

3. To provide such a sector type of scan utilizing a large percentage of the available dimensions on the face of the cathode ray tube.

In accordance with the present invention there is provided a method and means for providing a sector type of scan on a cathode ray tube associated with some types of radio object-locating systems. The magnetic field in a portion of the neck of the cathode ray tube is controlled by three sets of deflection coils, one for a constant horizontal component of deflection, one for a constant vertical component of deflection, and one rotating coil assembly to give the PPI effect. The constant deflection coils pull the center of the sweep near the edge of the screen, so that the length of a single sweep path may be appreciably greater than the radius of the screen.

This invention will best be understood by reference to the drawings, in which:

Fig. 1 is a simplified side view of one type of cathode ray tube showing the position of the deflection coils in association therewith;

Fig. 2 is a perspective view of one embodiment of the present type of coil assembly; and Fig. 3 is a simplified diagram of the front of the cathode ray tube showing the present sweep presentation.

Figure 4:
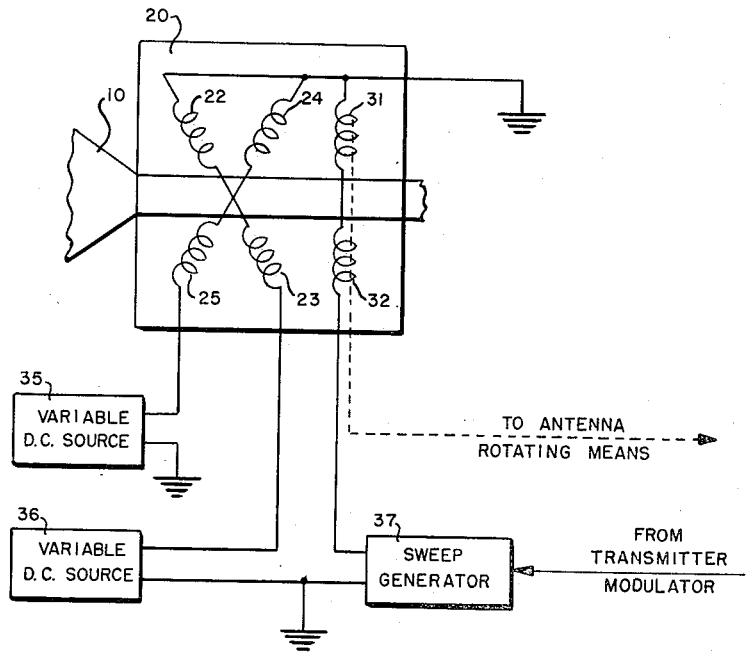
Fig. 4 is a block diagram of the electrical circuit associated with the deflection coils.

Referring now to a description of the apparatus and to Fig. 1, there is shown the approximate outline of one type of cathode ray tube. All connections to the tube are omitted for simplicity. The narrow portion 10 of the tube will be called the neck, while the slightly rounded section 11 is called the face of the tube. The deflection coils are usually mounted in the vicinity of the area 12 on the neck of the tube.

Fig. 2 is a perspective sketch of one arrangement of the various deflection coils according to the present invention. It is assumed that the vertical axis of the face of the cathode ray tube is parallel to the vertical axis of the drawing. The coil mounting structure may consist of a flange 20 which is securely fastened to a rigid support, not shown. Attached to the flange 20 is a collar 21 which serves as a form over which the centering coils are placed. This collar 21 is of a material which offers a very small amount of attenuation to magnetic fields passing through it. The horizontal centering coils 22 and 23 are formed so as to lie close to the surface of the collar 21 in a manner similar to that pictured in Fig. 2. The vertical centering coils 24 and 25 are formed so as to lie as close as is practicable to the surface of collar 21, it being necessary in some instances to allow these coils to overlap coils 22 and 23, so they must be laid on top of a small portion of coils 22 and 23.

Held rigidly through a ball bearing consisting of balls 26 and races 27 and 28 is a flange 29 to which is securely fastened a collar 30, which also provides a very low attenuation to magnetic fields. The rotating deflection coils 31 and 32 are formed so as to lie close to the surface of this collar 30. The assembly consisting of flange 29, collar 30 and coils 31 and 32 may be rotated by any one of a number of means, not shown, at the same speed as, and synchronously with, the rotating antenna. This coil assembly is mounted on the cathode ray tube in the position shown in Fig. 1, with the collar 30 fitting coaxially over, but not in contact with, the narrow portion of the tube. Connections are made to each of these three pairs of coils from outside sources of energy, not shown.

Fig. 3 is a drawing of the face of the cathode ray tube screen when a type of deflection such as that typified by the present invention is being used. Circle 40 represents the extreme outer limits of the screen, with point 41 being at the geometrical center thereof. The effective center of the sweep shown is at point 42, with the sweep extending from one limit 43 to the other limit 44. The angle A represents the azimuth angle of the displacement of the effective center 42 from the geometrical center 41, and the distance r represents the distance between centers.

Fig. 4 is a block diagram of the electrical circuits associated with the various deflection coils. Horizontal centering coils 22 and 23, vertical centering coils 24 and 25, and rotating deflection coils 31 and 32 are schematically shown, within mounting flange 20 which surrounds the neck of cathode ray tube 10. Horizontal centering coils 22 and 23 are serially connected across variable direct current source 36. Similarly vertical centering coils 24 and 25 are serially connected across variable direct current source 35. Variable direct current sources 35 and 36 can be varied independently of each other. Rotating deflection coils 31 and 32 are serially connected across sweep generator 37. Sweep generator 37 is a saw-tooth wave generator which is synchronized by pulses from the modulator of the transmitter of the radio object locating system with which the present invention is associated. Since sweep generators of the type described, are well known in the art, a detailed discussion thereof at this time is unnecessary. Rotating deflection coils 31 and 22 are coupled to the antenna rotating means of the associated radio object locating system to be rotated in synchronism with the rotation of the antenna thereof. This coupling may be through a direct mechanical connection or through a self-synchronous generator and motor, which are well known in the art.

Referring now to a description of the operation of the invention and to Figs. 2, 3 and 4, it can be seen that the resultant magnetic field set up by the current flowing in coils 22 and 23 moves the beam of electrons in a horizontal direction, the amount of current flowing, hence the amount of horizontal deflection, being determined by the magnitude set at variable direct current source 36, and the direction of current flow, dependent upon the polarity of source 36, determining whether the deflection is to the right or to the left, as viewed from the face of the tube.

Similarly it may be seen that the resultant magnetic field set up by currents flowing in coils 24 and 25, due to source 35, moves the beam of electrons in a vertical direction.

Therefore, it will be seen that the setting of sources 35 and 36 determines the quiescent deflection of the beam of electrons. Thus, the effective center of the sweep pattern will be at some point such as 42, Fig. 3. If desired constant deflection distance r and the desired angle A are known, source 36 is set so that the current in the horizontal deflection coils 22 and 23 is made proportional to r cos A and source 35 is set so that the current in the vertical deflection coils 24 and 25 is made proportional to r sin A.

The sawtooth wave of current fed to rotating coils 31 and 32 from sweep generator 37 provides a PPI effect. This current increases linearly up to a certain value, and then quickly returns to a base value, whereupon it is again ready for the linear increase. This action occurs periodically, several hundred times a second in synchronism with the transmission of pulses, while the coil assembly is rotating with the antenna.

If the magnetic fields set up by the three sets of coils are thought of as adding vectorially at any instant, it is an easy matter to see that the pattern of Fig. 3 is obtained. The sawtooth current in the rotating coils causes the spot on the face of the tube to move from quiescent center 42 to a point on arc 45 once each sawtooth wave cycle. Thus it is seen that a more efficient use of the screen, as far as range display is concerned, is provided by this type of scan.

The desirability of placing the horizontal and vertical centering coils in such a manner that the magnetic fields therefrom occupy approximately the same portion of space as the field from the rotating coil, is great. It is seen that with this arrangement the beam of electrons suffers only one deflection, this being the result of the vector addition of the three fields. On the other hand, if an arrangement is made such that the horizontal and vertical centering coils are adjacent to the rotating coil, there being a distance between them along the direction of the path of the electrons, it is seen that a certain amount of distortion and non-linearity would occur. The electrons would be deflected in an S-shaped manner due to the fact that an electron would suffer two separate deflections, one following the other.

A so-called delayed sector scan may be provided by causing the effective center 42 to fall off the face of the tube and by allowing the spot to show up only after a certain time from the start of the sweep. A rectangular wave of voltage may be applied to one of the electrodes of the cathode ray tube to blank out the spot during the first part of the sweep. This will further expand the range scale of the particular portion of space in which one is interested.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Means for producing a sector type of scan on the face of a cathode ray tube to be used in conjunction with a rotating antenna of a radio object-locating system comprising a cathode ray tube, a first coil pair means situated in the vicinity of the neck of the cathode ray tube, means for applying direct current to said first coil pair means, whereby the magnetic fields set up by currents in each of the coils of said first coil pair are additive in substantially the same direction, second coil pair means adjacent to said first coil pair means, means for applying direct current to said second coil pair means, whereby the magnetic fields set up by currents in each of the coils of said second coil pair are additive in substantially the same direction, said first and second coil pair means constituting deflecting means, third coil pair means adjacent said other coil pair means and rotatably mounted and adapted to be mechanically coupled to said rotating antenna so that it rotates substantially synchronously therewith, means for applying current from a source of sawtooth current waves to said third coil pair means, whereby the varying magnetic field set up by the currents in said third coil pair means deflects the beam of electrons in such a manner that a sector type of scan is obtained, all of said coil pair means being mounted about the same portion of the neck of said tube whereby the magnetic fields set up by currents in all of said coil pair means add vectorially to produce a single deflection of the beam of electrons.

2. Means for producing a sector type of scan on the face of a cathode ray tube to be used in conjunction with a rotating structure comprising a cathode ray tube, first coil means situated in the vicinity of the neck of the cathode ray tube, means for applying direct current from a current source to said first coil means, second coil means adjacent to said first coil means, means for applying direct current from a current source to said second coil means, said first and second coil means constituting deflecting means, third coil means adjacent said other coil means and rotatably mounted and adapted to be mechanically coupled to said rotating structure so that it rotates substantially synchronously therewith, means for applying current from a source of sawtooth current waves to said third coil means, whereby the varying magnetic field set up by the current in said third coil means deflects the beam of electrons in such a manner that a sector type of scan is obtained, all of said coil means being mounted about the same portion of the neck of said tube whereby the magnetic fields set up by currents in all of said coil means add vectorially to produce a single deflection of the beam of electrons.

3. Means for producing a sector type of scan on the face of a cathode ray tube to be used in conjunction with a rotating structure comprising a cathode ray tube, first coil means situated in the vicinity of the neck of the cathode ray tube, means for applying direct current to said first coil means, said first coil means constituting deflecting means, second coil means adjacent said first coil means and rotatably mounted and adapted for coupling said second coil means to said rotating structure in such a manner that said second coil means rotates substantially synchronously therewith, means for coupling sawtooth current waves from an outside source to said second coil means, whereby the varying magnetic field set up by said second coil means deflects the beam of electrons in such a manner that a sector type of scan is obtained, both of said coil means being mounted about the same portion of the neck of said tube whereby the magnetic fields set up by currents in said coil means add vectorially to produce a single deflection of the beam of electrons.

4. A method of producing a sector type of scan on the face of a cathode ray tube comprising the steps of producing a constant component of deflecting force for the beam of electrons in a first direction by means of a first component of electromagnetic field, producing a constant component of deflecting force for the beam of electrons in a second direction by means of a second component of electromagnetic field, and producing a polar type of deflection for the beam of electrons by means of a rotating component of electromagnetic field, all of said electromagnetic fields operating on the same portion of the beam of electrons.

LELAND J. HAWORTH.

REFERENCES CITED

The following references are of record in the file of this patent:

UNITED STATES PATENTS

| Number | Name | Date |
| --- | --- | --- |
| 2,098,390 | Iams | Nov. 9, 1937 |
| 2,380,929 | Ahier et al. | Aug. 7, 1945 |
| 2,389,995 | Packer | Nov. 27, 1945 |